US010484095B2

(12) United States Patent
Welle

(10) Patent No.: US 10,484,095 B2
(45) Date of Patent: Nov. 19, 2019

(54) COMMUNICATIONS RELAY SATELLITE WITH A SINGLE-AXIS GIMBAL

(71) Applicant: The Aerospace Corporation, El Segundo, CA (US)

(72) Inventor: Richard P. Welle, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 23 days.

(21) Appl. No.: 15/623,732

(22) Filed: Jun. 15, 2017

(65) Prior Publication Data

US 2018/0367216 A1    Dec. 20, 2018

(51) Int. Cl.
| | |
|---|---|
| H04B 10/29 | (2013.01) |
| H04B 10/50 | (2013.01) |
| H04B 10/66 | (2013.01) |
| H04B 7/195 | (2006.01) |
| H04B 7/185 | (2006.01) |

(52) U.S. Cl.
CPC ......... H04B 10/29 (2013.01); H04B 7/18515 (2013.01); H04B 7/195 (2013.01); H04B 10/503 (2013.01); H04B 10/66 (2013.01)

(58) Field of Classification Search
CPC ...... H04B 10/40; H04B 10/11; H04B 10/112; H04B 10/1121; H04B 10/1123; H04B 7/185; H04B 7/18502; H04B 7/1851; H04B 7/18513; H04B 7/18515; H04B 7/18532; H04B 7/18539
See application file for complete search history.

(56) References Cited

U.S. PATENT DOCUMENTS

| | | | | |
|---|---|---|---|---|
| 5,689,354 | A  * | 11/1997 | Orino ................ | H04B 10/1125 398/129 |
| 6,104,513 | A  * | 8/2000 | Bloom ............... | H04B 10/1125 398/1 |
| 6,239,763 | B1 * | 5/2001 | Cuchanski ............ | H01Q 19/19 343/781 CA |
| 6,441,800 | B1 * | 8/2002 | Chan ....................... | H01Q 1/18 244/172.6 |
| 6,894,818 | B1 * | 5/2005 | Cicchiello .......... | G02B 26/0816 359/201.1 |
| 9,438,338 | B1 * | 9/2016 | Chan ..................... | H04B 10/11 |
| 10,039,103 | B2 * | 7/2018 | Wang ................. | H04B 10/1123 |
| 2003/0034432 | A1 * | 2/2003 | Presby ............... | H04B 10/1121 250/201.9 |
| 2004/0120418 | A1 * | 6/2004 | Pasternak ............. | H01Q 1/125 375/272 |
| 2004/0122568 | A1 * | 6/2004 | Montfort ............. | G05D 1/0883 701/4 |

(Continued)

Primary Examiner — Tanya T Motsinger
(74) Attorney, Agent, or Firm — LeonardPatel PC

(57) ABSTRACT

An apparatus for simultaneously receiving and transmitting data in space may include a receiver configured to receive an incoming beam transmitted from a source along a receive vector between the source and the receiver. The apparatus may also include a transmitter to generate a transmitted beam along a transmit vector. The apparatus may further include a single-axis gimbal configured to rotate the transmit vector about an axis substantially perpendicular to the receive vector, and an attitude-control system configured to rotate the apparatus about an axis parallel to the receive vector or the transmit vector.

20 Claims, 12 Drawing Sheets

(56) References Cited

U.S. PATENT DOCUMENTS

| | | | | |
|---|---|---|---|---|
| 2005/0048915 | A1* | 3/2005 | Westall | G01S 1/08 |
| | | | | 455/13.3 |
| 2006/0109573 | A1* | 5/2006 | Jackson | G02B 26/0816 |
| | | | | 359/872 |
| 2007/0053695 | A1* | 3/2007 | Margaritis | H04B 10/1127 |
| | | | | 398/131 |
| 2009/0262037 | A1* | 10/2009 | Matyas | H01Q 19/12 |
| | | | | 343/779 |
| 2011/0243043 | A1* | 10/2011 | Jackson | H01P 1/2138 |
| | | | | 370/297 |
| 2012/0169053 | A1* | 7/2012 | Tchoryk, Jr. | G01P 5/26 |
| | | | | 290/44 |
| 2013/0315604 | A1* | 11/2013 | LoPresti | H04B 10/1123 |
| | | | | 398/116 |
| 2014/0044434 | A1* | 2/2014 | Hashimoto | H04B 10/118 |
| | | | | 398/125 |
| 2014/0218749 | A1* | 8/2014 | Trail | G02B 23/06 |
| | | | | 356/510 |
| 2014/0363161 | A1* | 12/2014 | Oikawa | H04J 14/0202 |
| | | | | 398/48 |
| 2016/0173199 | A1* | 6/2016 | Gupta | H04B 10/11 |
| | | | | 398/127 |
| 2016/0211908 | A1* | 7/2016 | Noerpel | H04B 7/18506 |
| 2016/0226584 | A1* | 8/2016 | Chalfant, III | H04B 10/112 |
| 2016/0365630 | A1* | 12/2016 | Rao | H01Q 3/20 |
| 2017/0339695 | A1* | 11/2017 | Wang | H04B 10/1123 |
| 2018/0069629 | A1* | 3/2018 | Turgeon | H01Q 1/288 |
| 2018/0227054 | A1* | 8/2018 | Hreha | H04B 10/118 |
| 2018/0367212 | A1* | 12/2018 | Reis | H04B 7/18513 |
| 2019/0028197 | A1* | 1/2019 | Turner | H04B 10/118 |
| 2019/0061978 | A1* | 2/2019 | Kitamura | B64G 1/28 |

* cited by examiner

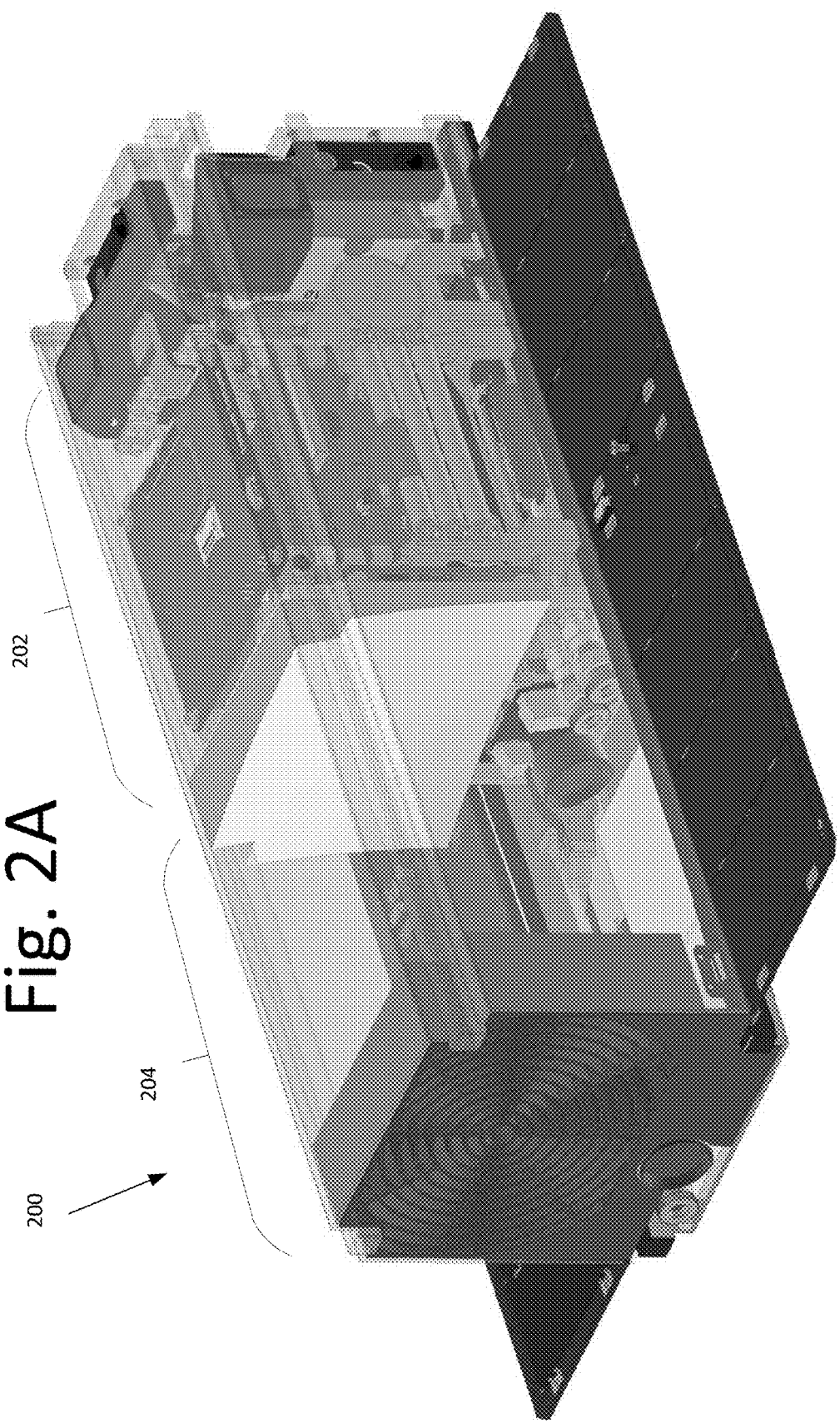

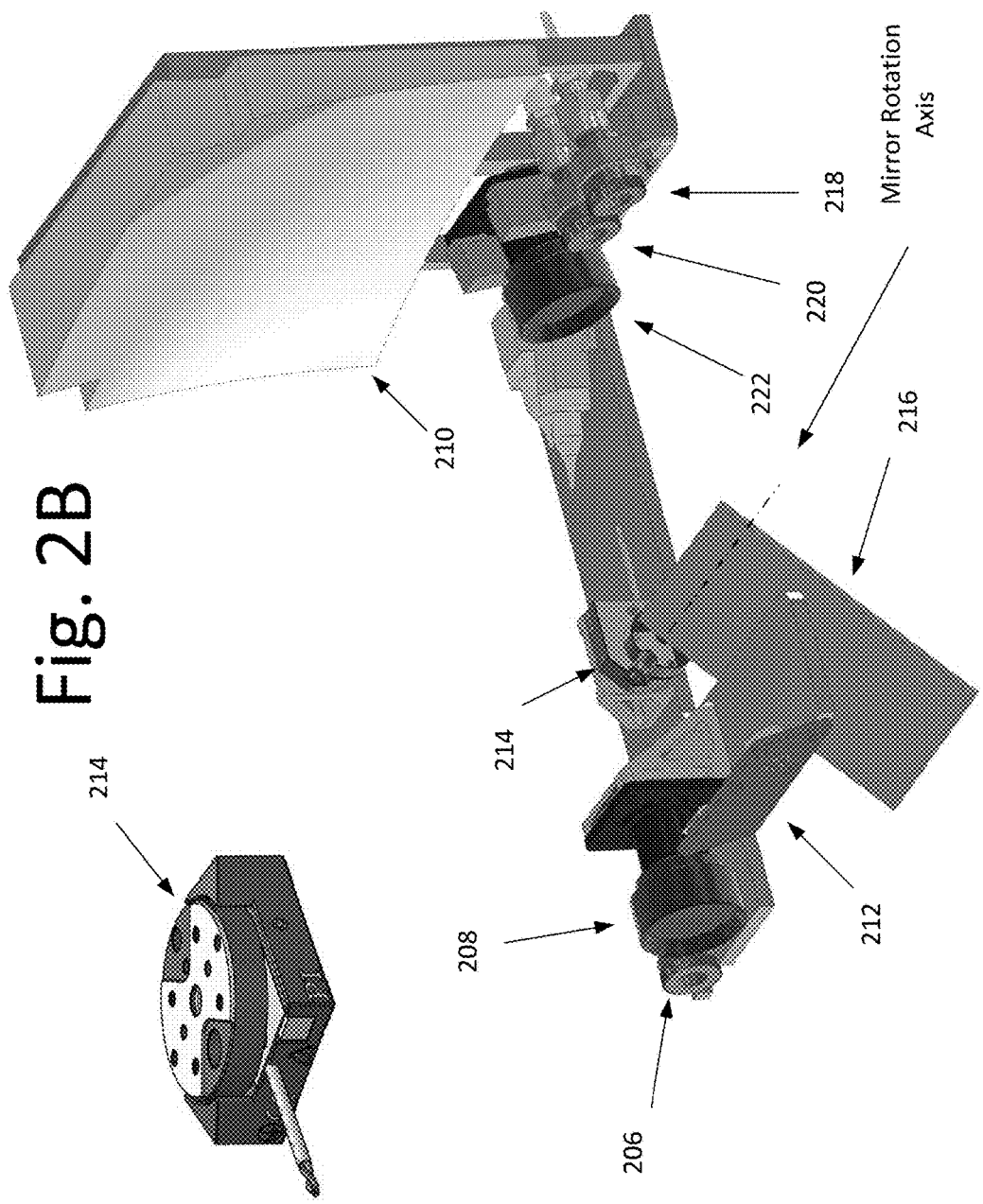

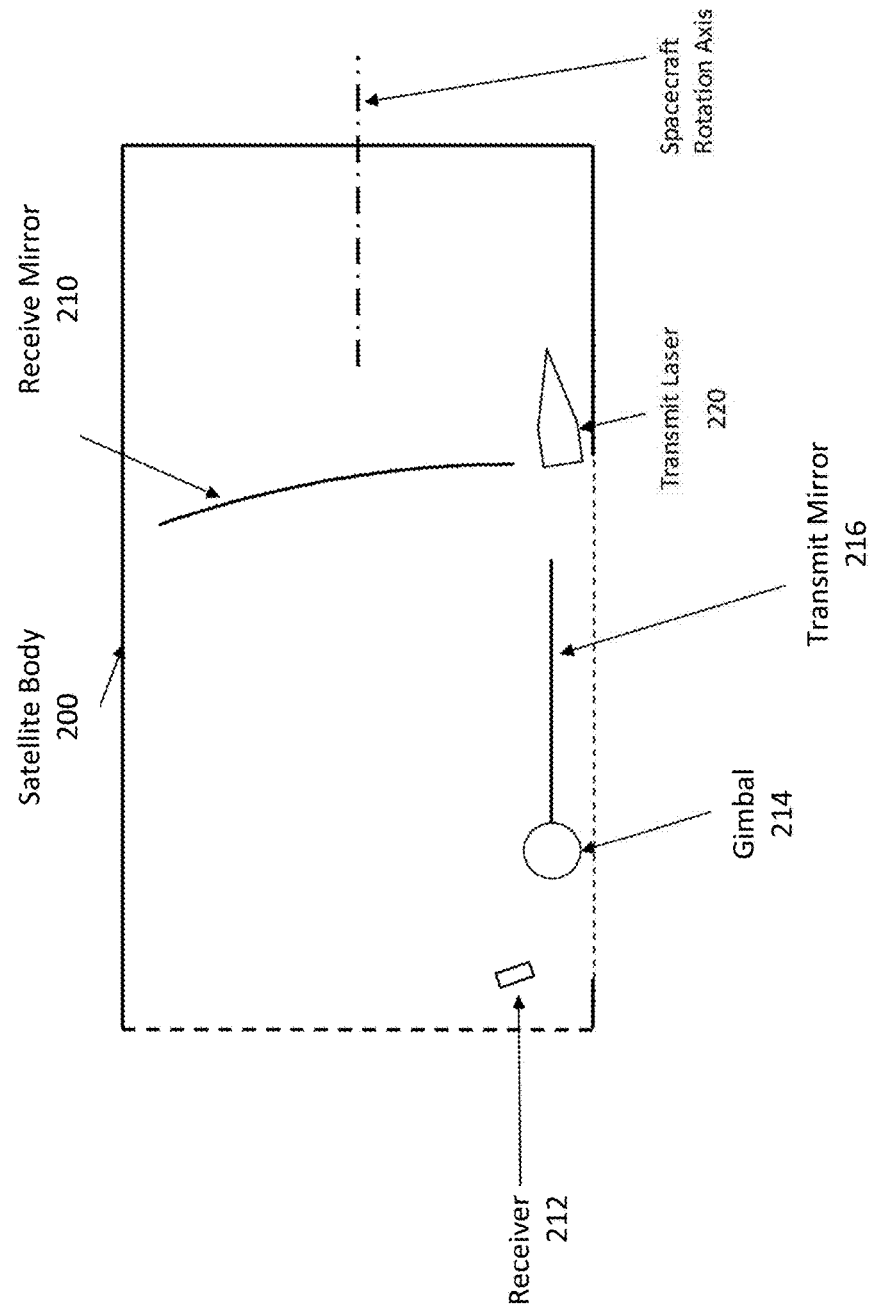

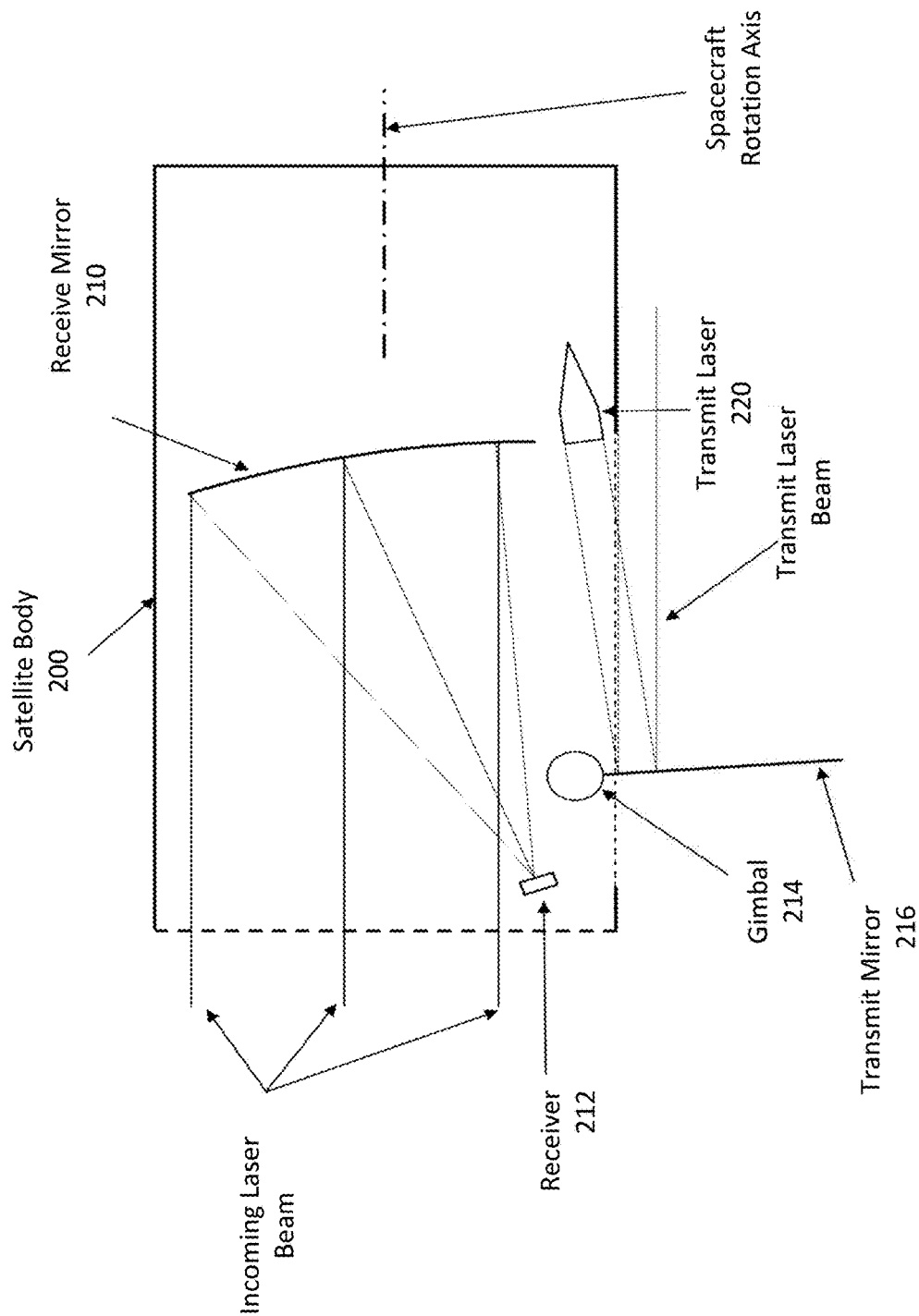

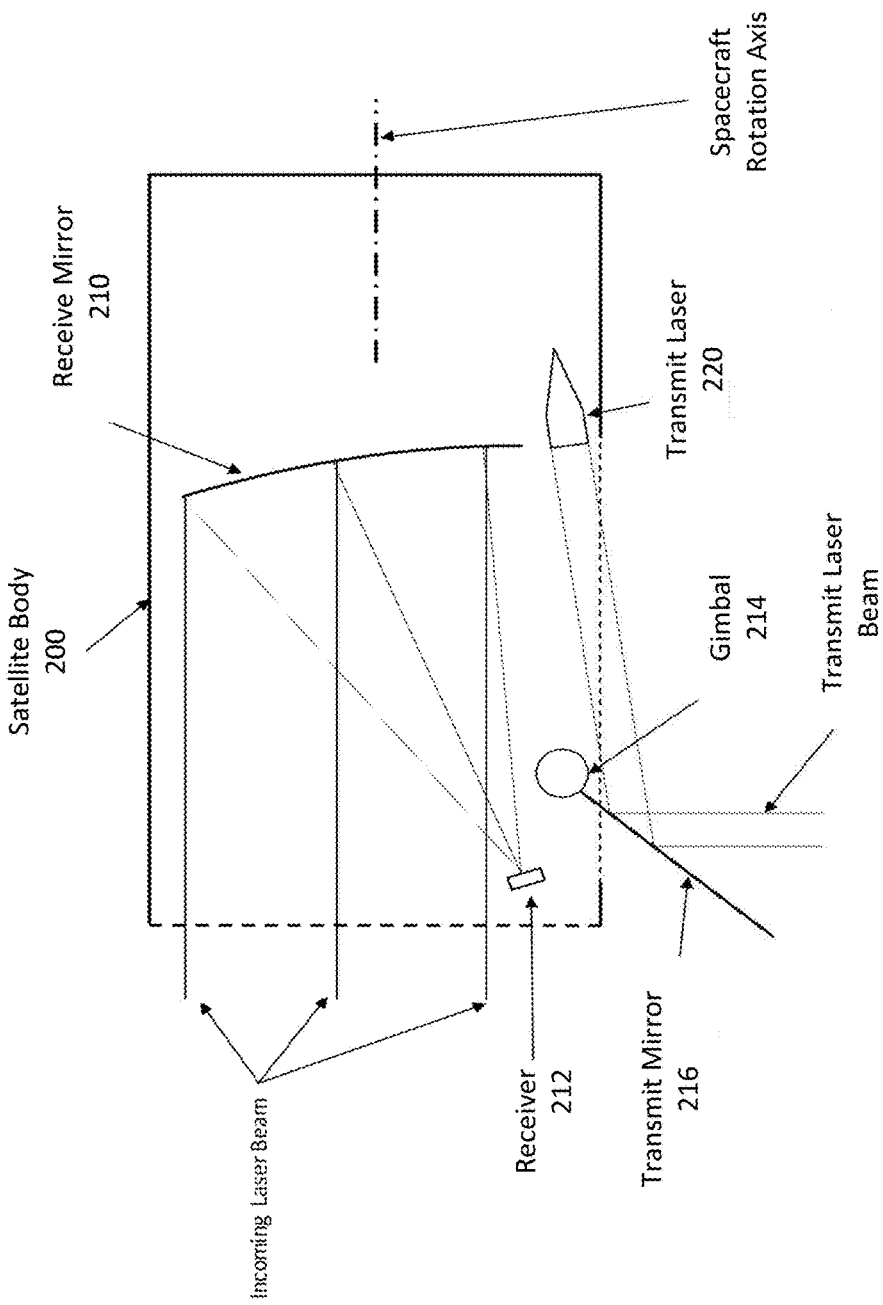

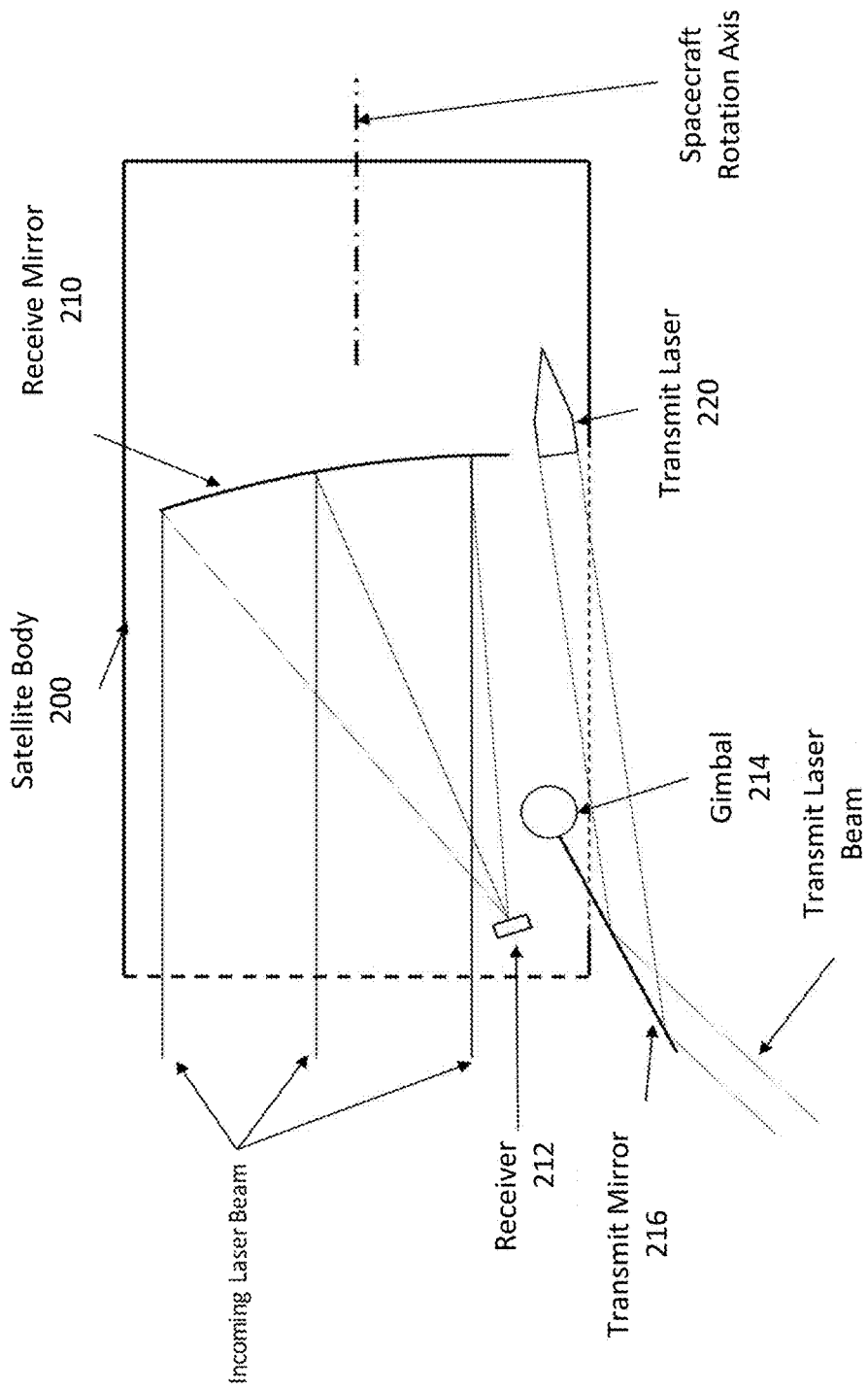

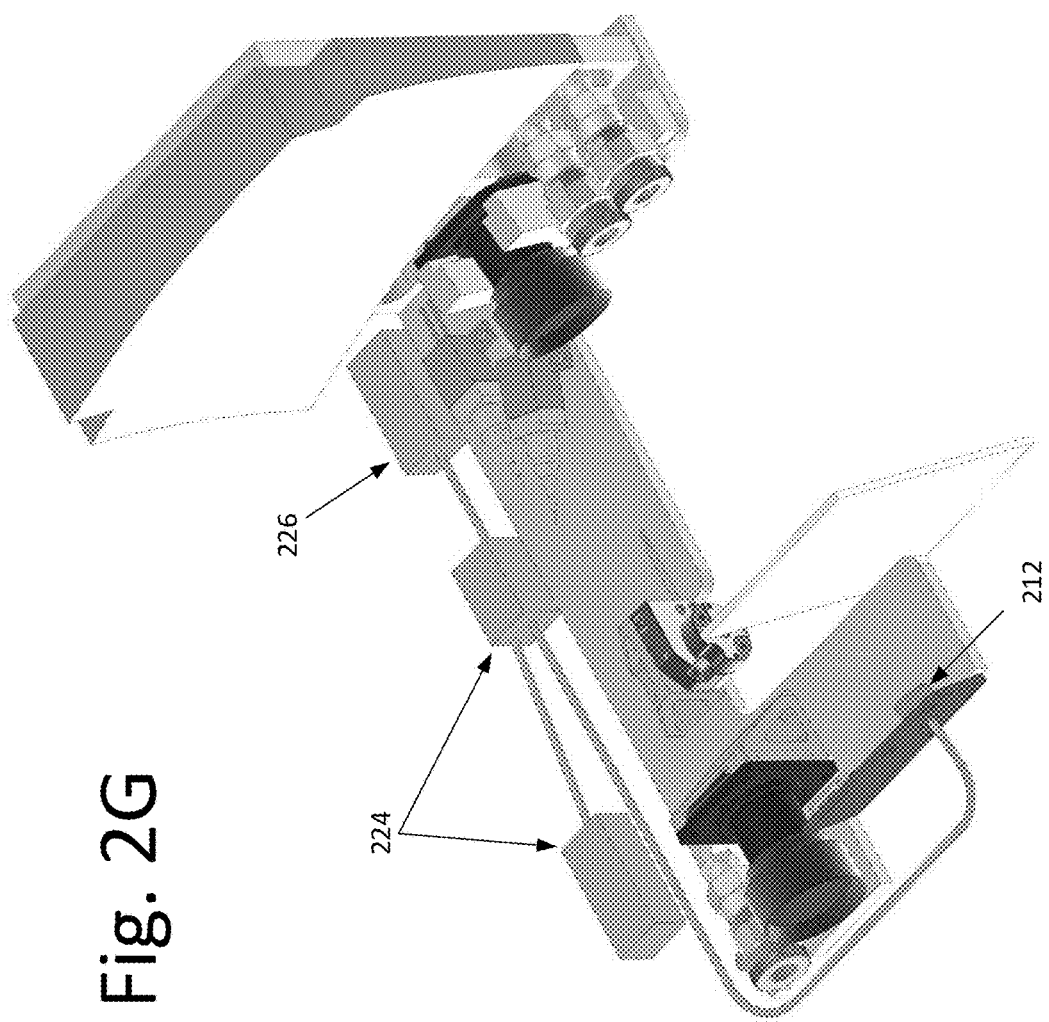

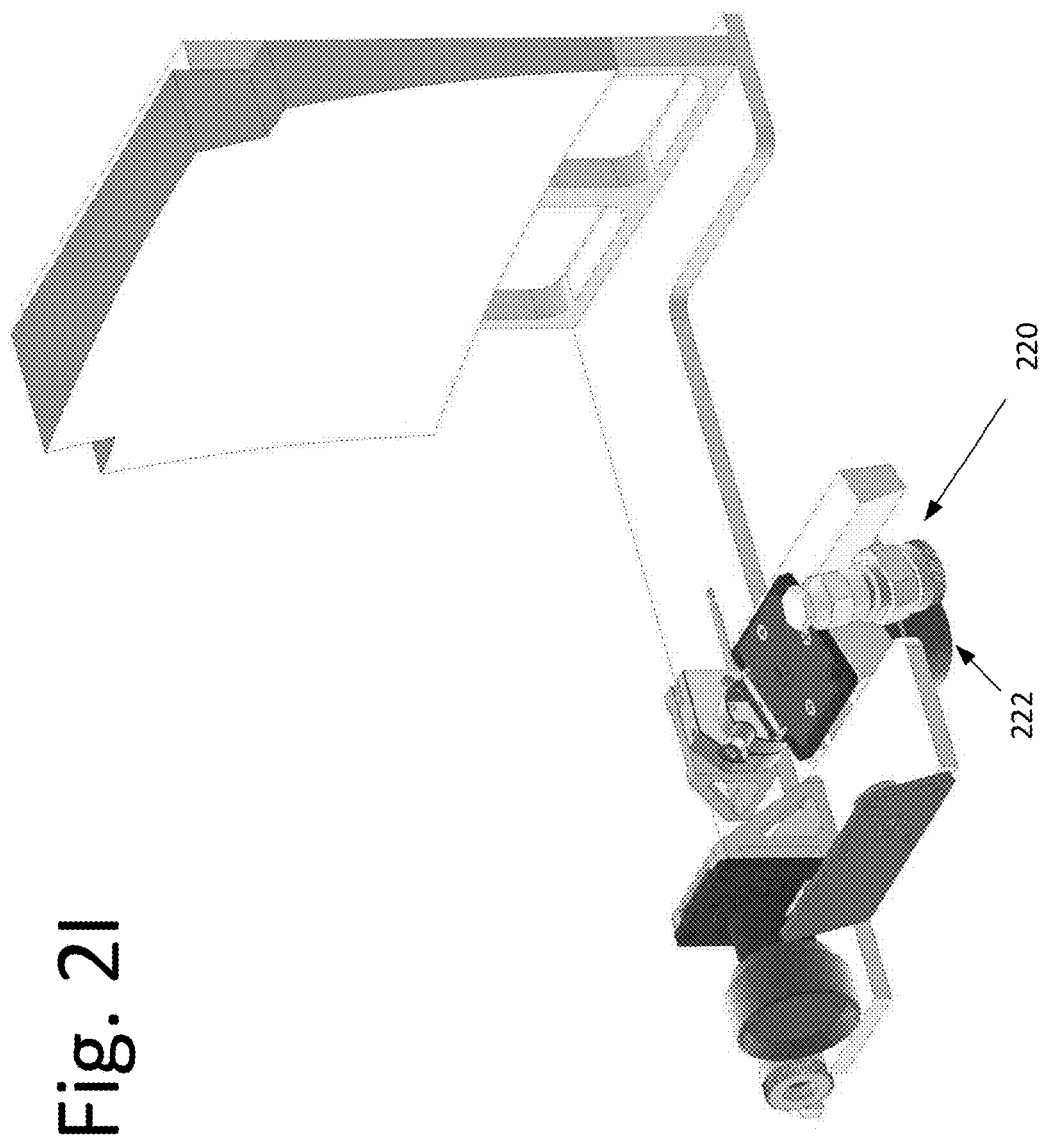

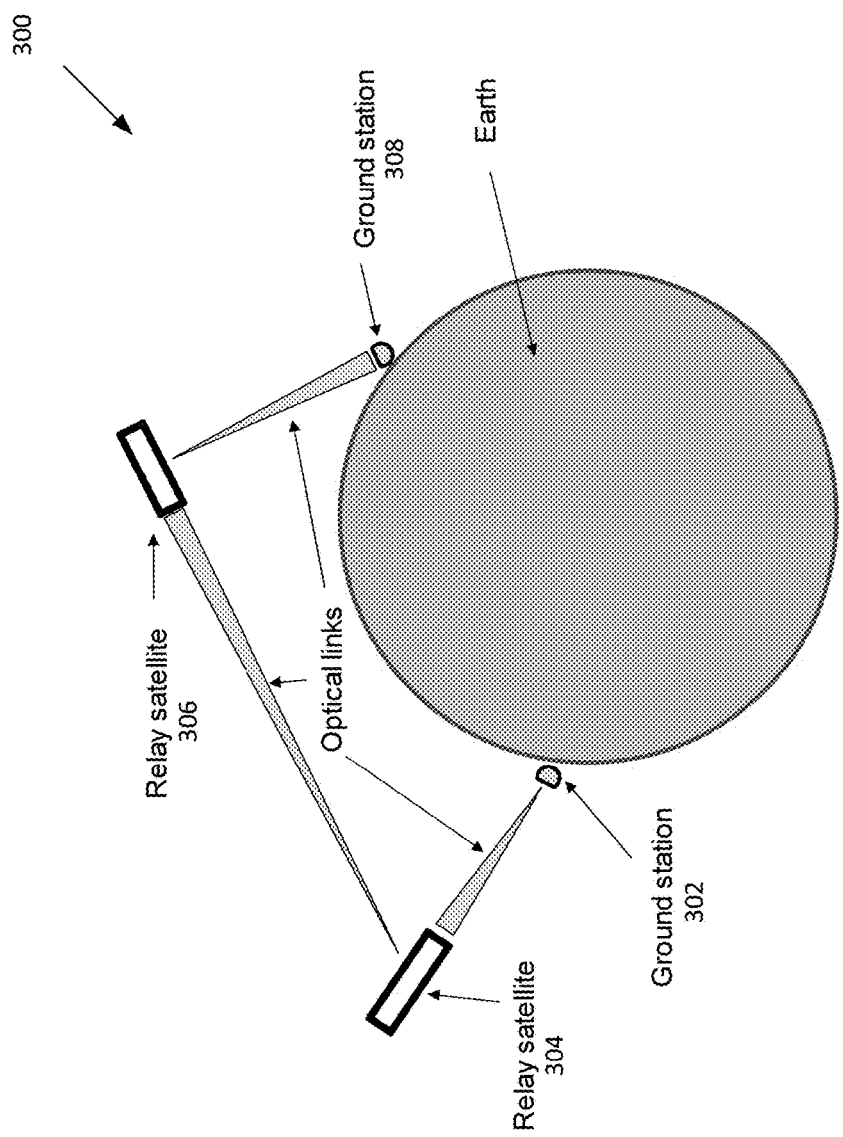

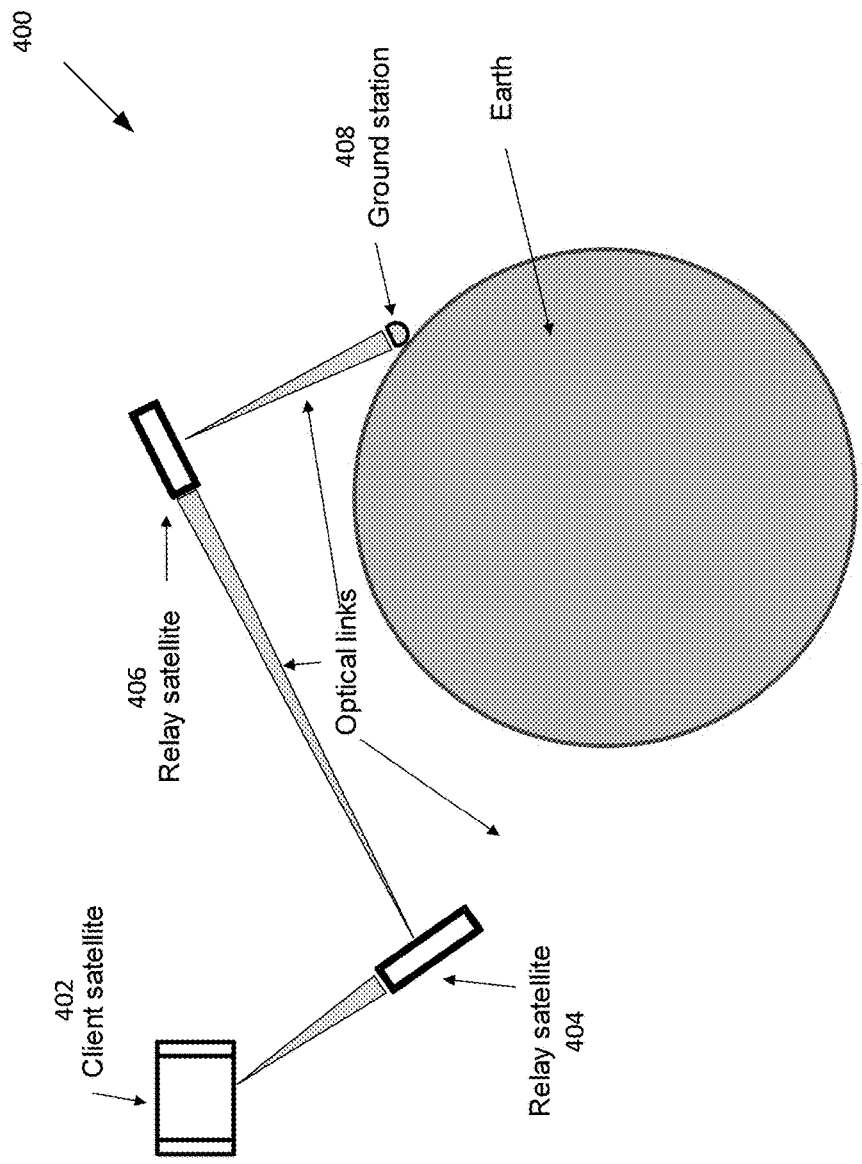

COMMUNICATIONS RELAY SATELLITE WITH A SINGLE-AXIS GIMBAL

FIELD

The present invention relates to relaying information, and more particularly, to a communications relay satellite with a single-axis gimbal that provides high-rate communication.

BACKGROUND

Recent progress in sensor technology has allowed low-Earth-orbit (LEO) satellites to shrink significantly in size, disrupting a legacy industry where traditional satellites cost $500 million to $1 billion to build and launch. Major investments are being made to address the new opportunities this provides for data collection, and many companies are launching nanosatellites and/or microsatellites into LEO to capture this opportunity. The rapidly expanding satellite infrastructure is generating vast amounts of data, reaching nearly 20 PB/year in 2014, with no signs that the trend will level off. To bring the data down from LEO requires an average communication rate of 5 Gb/s, continuously, and that demand will continue to grow.

Typically, most satellites download data via space-to-ground radio-frequency (RF) links, communicating directly with fixed ground stations as the satellites fly within range. The current ground station infrastructure has several key limitations that present significant challenges as the satellite industry continues to grow. Satellite-to-ground communications are "line-of-sight," meaning that ground stations can receive data directly only from satellites that are above the local horizon. The duration of a satellite pass over a ground station depends on the altitude of the satellite and the distance between the ground station and the ground track of the satellite. With satellites in LEO, the maximum pass duration is typically less than ten minutes.

The frequency of passes is strongly dependent on the satellite orbit parameters and the location of the ground station. For example, a satellite in equatorial orbit will pass over an equatorial ground station on each orbit. With a typical orbital period of 90 minutes, that means 16 passes per day. Similarly, a satellite in a polar orbit will pass over a ground station located at the North Pole once per orbit. On the other hand, the satellite in polar orbit will pass over the equatorial ground station between two and four times per day depending on the alignment of the ground track with the location of the ground station. However, the satellite in equatorial orbit will never pass over the polar ground station. Most LEO satellites are in orbits at some inclination between equatorial and polar, and most ground stations are located at latitudes well south of the North Pole. As such, the pass frequency for any given satellite over any given ground location will typically be three to five times per day for ground stations that are not at high latitude (above about 60 degrees) and not at latitudes higher than the orbital inclination of the satellite.

The consequence of limitations on pass duration and frequency is that a satellite in LEO will be within communication range of a given ground station for no more than 10 percent of a day, and typically for less than 2 percent of a day. These constraints on pass duration and pass frequency are driven by orbital dynamics and can be overcome by increasing the number of ground stations or locating the ground stations at very high latitudes. Avoiding downlink constraints requires a large number of geographically-diverse ground stations that are inherently underutilized.

One method of compensating for the limitations on ground contact time is to increase the data transmission rate during available contact time. High data rates in the RF require some combination of high transmitter power and high-gain antennas on the satellite and the ground station. High power transmitters and high-gain antennas on the space segment are constrained by power and mass limitations on the satellite. High-gain antennas on the ground are not mass limited, but tend to be very large (e.g., 10 meters or more in diameter) and require significant capital investment.

As data produced in LEO increases substantially with more satellites launched, downlink infrastructure must grow to meet demand. However, a more fundamental limitation to downlink rates will be encountered in the future, simply due to the overuse of available RF bandwidth in the space environment. Further, adding new RF ground terminals will not help, because the stations will interfere with one another. Similarly, RF bandwidth is constrained on the space side, i.e., when two satellites are relatively close to one another, their RF signals can interfere.

For new satellite companies leveraging advances in satellite costs, capital investment for an extended ground station network is particularly burdensome because the size and cost of the ground network does not scale with the size of the satellites. Ground station costs have not scaled at the same rate as satellite costs, requiring significant further investment to match growth in satellite capacity.

Laser communication has the potential to provide data rates adequate to handle all the data generated on orbit for the foreseeable future. However, current laser communication technology requires placing expensive laser transmitters on each satellite, and further placing operational constraints on the satellite (e.g., pointing, jitter, etc.) that are often beyond the capability of budget satellites. Thus, there is a need for a laser communication system that can support a broad range of satellites at a moderate cost and without putting undue burden on the satellites.

There have been proposals for a distributed constellation of satellites in Earth orbit, called network satellites, that would enhance the utility of client satellites in Earth orbit by providing a high-bandwidth data link to ground. Client satellites include any satellite in Earth orbit that collects data at a high rate, where high can mean that satellite operations are constrained by availability of communications bandwidth, or that satellite operations require one or more dedicated ground stations. The network satellites receive data from the client satellites, and subsequently, transfer the client data to the ground using optical communication. The proposed system also includes several widely-distributed optical ground stations for receiving data from the network satellites.

In the proposed system, the network satellites were envisioned to have high-gain RF receivers that receive data from client satellites. In addition, the network satellites were envisioned to have laser communication transmitters to send data to the ground. Another form of the network satellites had both laser transmitters and optical receivers (telescopes) to receive data transmitted by other laser systems.

In both types of network satellites, simultaneous operation of both the receive mode and the transmit mode would not be possible because the pointing requirements of the receiver (whether optical or RF) would be incompatible with the pointing requirements of the transmitter. In the current state of the art, this problem is solved using a two-axis gimbal system that allows the laser to point in the required direction and with its required degree of precision, while the rest of the satellite would point as necessary to receive the incoming signal. However, these two-axis gimbal systems tend to be both expensive, and too large for most small satellites.

Thus, an alternative communications relay satellite system may be beneficial.

SUMMARY

Certain embodiments of the present invention may provide solutions to the problems and needs in the art that have not yet been fully identified, appreciated, or solved by current communications relay satellite systems. For example, some embodiments of the present invention generally pertain to a relay node in a space-based communications network. The relay node (or satellite) may use a single-axis gimbal, combined with a full-body rotation of the satellite about the receive axis, to provide near universal pointing.

In an embodiment, a relay satellite may incorporate a high-gain receiver, a high-gain transmitter, an attitude-control system, and a single axis gimbal. In some embodiments, the axis of the gimbal is perpendicular to both the axis of the high-gain receiver and the axis of the high-gain transmitter, and allows the two communication axes to be rotated relative to one another about the axis of the gimbal. The satellite may allow simultaneous pointing at two locations in three-dimensional (3D) space by using the attitude-control system to rotate the satellite about the receive or transmit axis. In certain embodiments, the high-gain receiver and the high-gain transmitter may point to the required degree of precision at their respective targets without interfering with one another and may require a single-axis mechanical gimbal between them.

In another embodiment, an apparatus for simultaneously receiving and transmitting data in space may include a receiver configured to receive an incoming beam transmitted from a source along a receive vector between the source and the receiver. The apparatus may also include a transmitter to generate a transmitted beam along a transmit vector. The apparatus may further include a single-axis gimbal configured to rotate the transmit vector about an axis substantially perpendicular to the receive vector, and an attitude-control system configured to rotate the apparatus about an axis parallel to the receive vector or the transmit vector.

In yet another embodiment, an apparatus for receiving and transmitting data in space may include a receiver configured to receive an incoming beam from a source. The apparatus may also include an attitude control system configured to rotate the apparatus about an axis parallel to the incoming laser beam. The apparatus may further include a single axis gimbal configured to rotate a mirror about an axis perpendicular to the axis of the incoming laser beam, allowing a transmitter to transmit the laser beam to a destination.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 2A, 2B, and 2G-2I illustrate different prospective views of a satellite with a single axis gimbal, according to an embodiment of the present invention.

FIGS. 2C-2F illustrate a cross-section of the satellite with the single axis gimbal, according to an embodiment of the present invention.

FIG. 3 illustrates a satellite relay communication system 300 using single axis gimbal relay satellites, according to an embodiment of the present invention.

FIG. 4 illustrates a satellite relay communication system 400 using single axis gimbal relay satellites, according to an embodiment of the present invention.

DETAILED DESCRIPTION OF THE EMBODIMENTS

A communications relay satellite (referred to as "satellite") may enable separate pointing of the receive and transmit portions of the satellite, thereby enabling continuous communication through the node. The satellite may incorporate a high-gain receiver, a high-gain transmitter, an attitude control system, and a single-axis gimbal. In some embodiments, the axis of the gimbal is perpendicular to both the axis of the high-gain receiver and the axis of the high-gain transmitter. The axis of the gimbal may allow the two communication axes to rotate relative to one another about the axis of the gimbal.

The satellite may enable simultaneous pointing at two locations in three-dimensional space by using the attitude control system of the satellite to rotate the satellite about either the receive or transmit axis. A LEO network of these satellites may provide high-rate communication between any space asset and a ground network with latency limited only by the speed of light.

Figure 1:
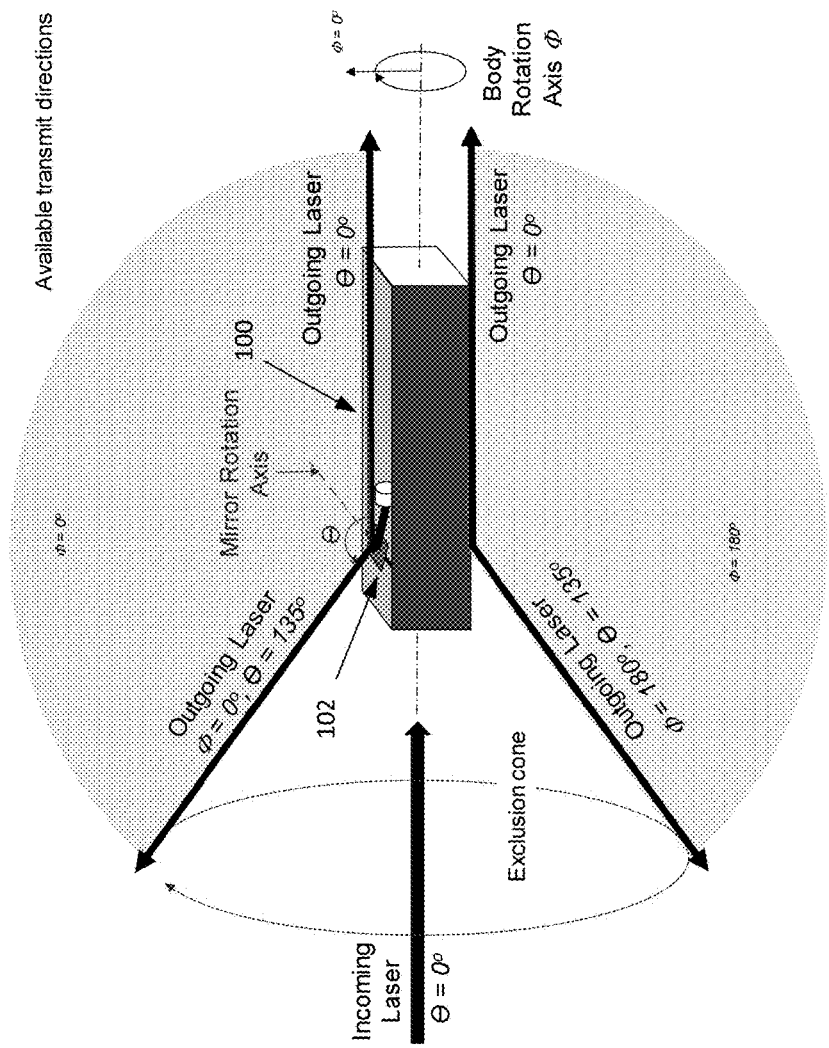
FIG. 1 illustrates available transmit directions for satellite with a single axis gimbal, according to an embodiment of the present invention.

FIG. 1 illustrates available transmit directions for satellite 100 with a single axis gimbal, according to an embodiment of the present invention. In some embodiments, satellite 100 may be capable of long range receiving and long range transmission by using the single axis gimbal. For example, satellite 100 may receive an incoming laser beam, and satellite 100 may rotate around the axis of the incoming laser. In certain embodiments, incoming laser beam may be referred to as incoming laser signal beam, incoming laser, incoming beam, incoming laser signal, or incoming signal. However, for purposes of explanation, the term "incoming laser beam" will be used. In some embodiments, the attitude-control system may point satellite 100 at the incoming laser, and without affecting reception of the incoming laser, satellite 100 may rotate around the axis of the incoming laser beam. For example, the attitude control system may rotate satellite 100 about an axis parallel to a receive or transmit vector. The receive or transmit vector in some embodiments is the path in which the incoming beam is received and the outgoing beam is transmitted. Concurrently, mirror 102, which is rotated by a gimbal about an axis perpendicular to the axis of satellite 100 or the incoming laser beam, may rotate to transmit the outgoing laser beam in the desired direction. In certain embodiments, the term outgoing laser beam may be referred to as outgoing laser signal beam, outgoing laser, outgoing signal, outgoing signal beam, or outgoing beam. However, for purposes of explanation, the term "outgoing laser beam" will be used.

Figure 2H:
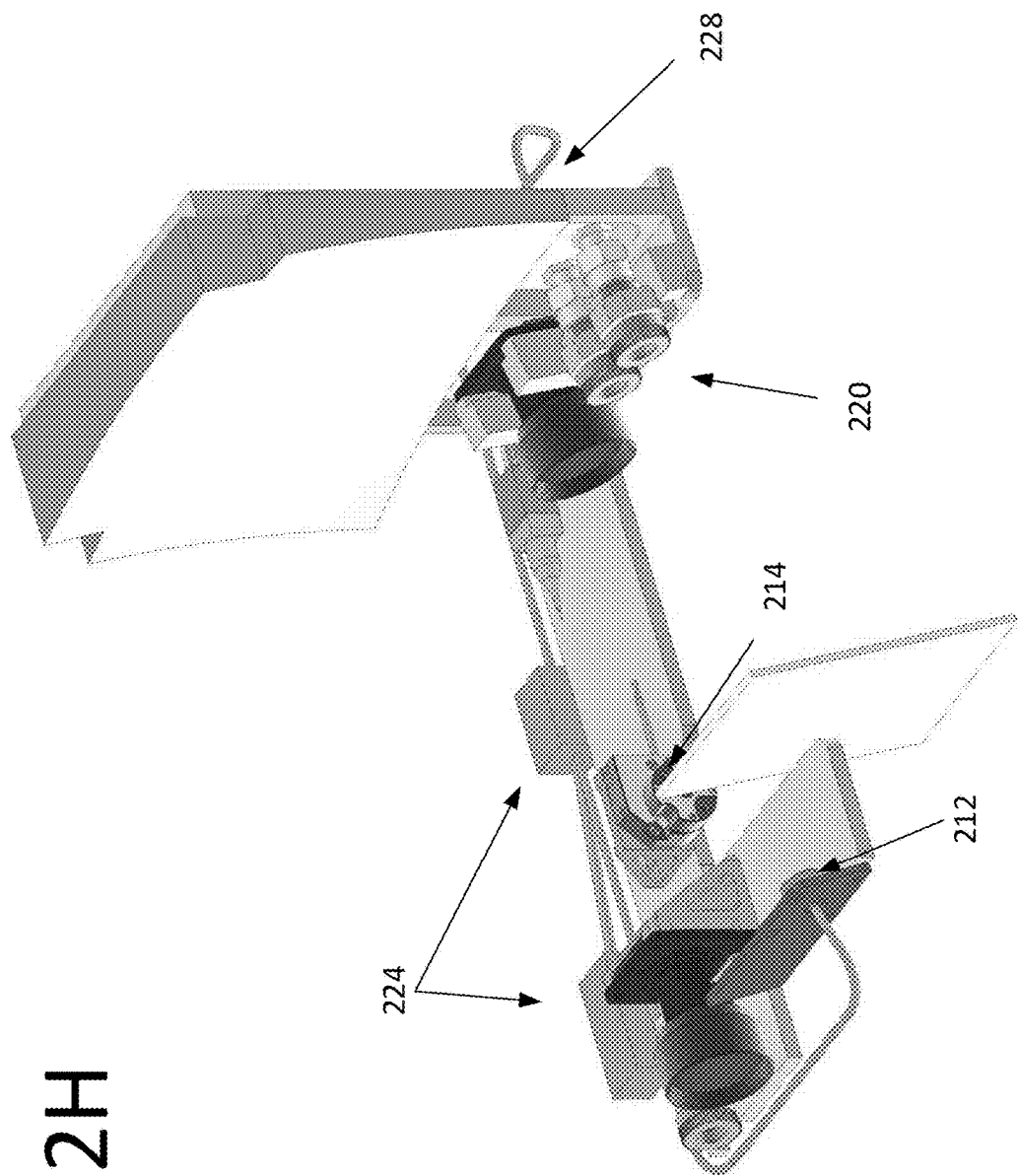

FIG. 2A illustrates a prospective view of a satellite 200 with a single axis gimbal, according to an embodiment of the present invention. In some embodiments, satellite 200 may include a first compartment 202 and a second compartment 204. First compartment 202 may contain non-payload satellite components including, but not limited to, power systems, attitude-control systems, radios, navigation systems, cameras, and other components required for satellite operations. Second compartment 204 may contain payload-related components of the satellite 200.

FIG. 2B illustrates a prospective view of the components of the second compartment 204, according to an embodiment of the present invention. For example, second compartment 204 may include a receive beacon 206, a receive beacon camera 208, a receive reflector 210, a receiver (or detector) 212, a gimbal 214, a transmit mirror 216, a transmit beacon 218, a transmitter laser output 220, a transmit beacon camera 222. In some embodiments, receive beacon 206 may provide an optical beacon visible to the source satellite to provide alignment information. In some embodiments, receive beacon camera 208 may detect a signal from the source satellite (not shown) for use in aligning the incoming laser beam with receiver (or detector) 212. In some embodiments, receive reflector 210 may act to focus the incoming laser beam onto receiver 212.

Receiver 212 may receive the incoming laser beam from the source satellite and convert the incoming laser beam to an electrical signal. In some embodiments, receiver 212 may be an optical fiber that receives the incoming laser beam and provides an optical amplification before conversion to the electronic signal. See FIG. 2G, optical fiber receiver 212, optical amplifier components 224 and optical detector 226. In some embodiments, the optical fiber 228 may connect directly to the transmit laser 220 without conversion to the electronic signal. See FIG. 2H, optical fiber receiver 212 and optical amplifier components 224.

In some embodiments, transmit laser output 220 may be a narrow beam modulated to carry a data signal. In some embodiments, transmit beacon 218 may be a laser with a divergence wider than transmit laser output 220 to provide a signal for the destination satellite to assist in alignment. In some embodiments, transmit beacon camera 222 may observe a beacon sent by the destination satellite (not shown) to aid in alignment of the transmit laser output.

Transmit mirror 216 may be attached to gimbal 214. Gimbal 214 in some embodiments is a single axis gimbal that may rotate transmit mirror 216. FIGS. 2C-F illustrate in cross section the motion of transmit mirror 216 and of the transmit laser beam. For example, FIG. 2C illustrates transmit mirror 216 in the stowed position (i.e., zero degrees rotation) as it may be for launch. FIG. 2D illustrates relay satellite 200 configured to relay an incoming laser beam. In this embodiment, satellite 200 is oriented with its axis parallel to the incoming laser beam and transmit mirror 216 is rotated to a position offset 86 degrees from the stowed position. With transmit laser 220 mounted to transmit at an angle of 8 degrees below the axis of satellite 200, the reflected laser beam (or outgoing laser beam) may be parallel to the axis of satellite 200.

In FIG. 2E, transmit mirror 216 is further rotated to a position of 131 degrees from the stowed position and the reflected (or outgoing) laser beam is oriented at 90 degrees from the axis of satellite 200. In FIG. 2F, transmit mirror 216 is rotated to a position 153.5 degrees from the stowed position, and the reflected (or outgoing) laser beam is oriented at 135 degrees from the axis of satellite 200. In one or more of these embodiments, the axis of rotation of transmit mirror 216 is perpendicular to the axis of rotation of satellite 200, which is parallel to the axis of the incoming laser beam. In certain embodiments, rotation of satellite 200 occurs simultaneously with the rotation of transmit mirror 216 without impeding the incoming laser beam and/or the outgoing laser beam.

FIG. 3 illustrates a satellite relay communication system 300 using single axis gimbal relay satellites, according to an embodiment of the present invention. In this embodiment, ground station 302 may transmit a laser beam to a relay satellite 304. Relay satellite 304, which includes a single axis gimbal, rotates about the axis of the incoming laser beam and uses the single axis gimbal to rotate the mirror (not shown) about an axis perpendicular to the axis of the incoming laser beam to reflect the outgoing laser beam to another relay satellite 306. Relay satellite 306 using a similar single axis gimbal may transmit a laser beam to another ground station 308.

FIG. 4 illustrates a satellite relay communication system 400 using single axis gimbal relay satellites, according to an embodiment of the present invention. In this embodiment, client satellite 402 may transmit a laser beam to a relay satellite 404. Relay satellite 404, which includes a single axis gimbal, rotates about the axis of the incoming laser beam and uses the single axis gimbal to rotate the mirror (not shown) about an axis perpendicular to the axis of the incoming laser beam to reflect the outgoing laser beam to another relay satellite 406. Relay satellite 406 using a similar single axis gimbal may transmit a laser beam to another relay satellite (not shown) or to ground station 408.

In order to relay the incoming beam, the relay satellites of FIGS. 3 and 4 in some embodiments convert the incoming beam to an electronic signal for amplification before converting it back into a laser beam for further transmission. In other embodiments, relay satellites may amplify the incoming beam for further transmission without first converting it to an electronic signal.

Some embodiments generally pertain to a communication satellite network that includes a constellation of relay satellites (or "satellites"). In certain embodiments, each satellite includes a receiver configured to receive data from a client satellite or another node in the communication satellite network. Each satellite also includes a transmitter configured to send data to another node in the communication satellite network or to a ground station. Each satellite further includes a gimbal configured to rotate the receiver and transmitter about an axis relative to one another, and an attitude control system configured to control the attitude of the satellite.

In certain embodiments, the receiver may be an optical telescope for receiving optical signals, or a high-gain RF receiver for receiving RF signals. The attitude-control system of the satellite may point the receiver of the satellite at the signal source to maintain signal quality. It should be appreciated that the signal from the signal source may arrive at the satellite along an axis defined by the vector between the source and the satellite. Since this vector is linear (and if polarization of the signal is not significant), the satellite is free to rotate about an axis defined by this vector without loss of signal quality.

The transmitter in some embodiments is a laser transmitter. However, in other embodiments, the transmitter may be a high-gain RF transmitter.

The satellite may receive and transmit a signal simultaneously in some embodiments. For example, since the destination of the transmitted signal may be anywhere in three-dimensional space, the satellite may incorporate a gimbal to allow pointing of the transmitter in any direction relative to the direction of the received signal. The gimbal may rotate the axis of the transmitter over an arc of 180 degrees relative to the axis of the receiver. For example, if the transmitter is a laser, the laser may be mounted to gimbal 214 such that the laser itself is rotated by 180 degrees as gimbal 214 moves. See FIG. 2I, transmit laser 220 and transmit beacon camera 222. In another embodiment, the laser may be mounted on the body of the satellite with the laser beam aimed to reflect from a mirror mounted on the gimbal. In those embodiments, rotating the gimbal by 90 degrees may cause the reflected laser beam to move through an arc of 180 degrees.

For purposes of explanation, consider a satellite located at the origin of a three-dimensional space defined by Cartesian coordinates such that the signal from the source arrives along the negative x axis. The satellite may then receive the signal by orienting the receiver to point in the negative x direction. In this example, the axis of rotation of the gimbal on the satellite may be perpendicular to the receiver axis, and therefore, perpendicular to the negative x axis of the coordinate system.

Further, the gimbal axis may be initially aligned along the y axis of the coordinate system. Also, the transmitter on the relay satellite may be attached to the gimbal such that the transmitter transmits along a direction perpendicular to the gimbal axis, and is initially aligned in the positive z direction.

Continuing with this example, the intended destination of the signal may be positioned such that the required transmit direction is along the positive y axis of the coordinate system. To transmit in that direction, the satellite may be rotated about the x axis by 90 degrees, without moving the gimbal. If, on the other hand, the intended destination is along a vector that goes through the point x=1, y=1, z=−1, then the satellite may be rotated about the x axis by 135 degrees and the gimbal may be rotated by 45 degrees. Since the satellite is free to rotate a full 360 degrees without adversely affecting the received signal, if the gimbal is capable of rotating the transmit beam through 180 degrees from the positive x direction to the negative x direction, then the transmitter can be pointed anywhere in space.

It should be noted that in this example the rotation of the satellite body is about the receive axis, with the gimbal moving the transmit axis relative to the satellite body. It is equally valid to have the satellite body rotate about transmit axis, with the gimbal moving the receive axis about the satellite body.

In an alternative embodiment, it may be necessary to have a reverse data flow for handshaking between the nodes, or simply allow data to flow in the other direction for convenience. To accomplish this, the satellite may include a coaxial receiver and transmitter in the body of the satellite that allows bi-directional communication with the signal source. In addition, a second set of a coaxial receiver and a transmitter may be mounted on the gimbal to allow bi-directional communication with the intended recipient of the signal, creating a fully bi-directional relay node. In effect, the system becomes fully symmetric, allowing data to flow in either direction. This is possible because the body of the satellite should point at one target, while the rotation of the gimbal combined with rotation of the satellite as a whole allows for pointing at the second target.

In yet another embodiment, the satellite may be part of a multi-satellite relay node such that the gimbaled portion of the satellite is used primarily for short-range communication to a near-by satellite in the same multi-satellite node.

Because the satellites are small and simple (e.g., a 3 U CubeSat would be adequate, and 1.5 U may also be sufficient, depending on requirements), initial deployment of the satellite network can be relatively inexpensive. A set of satellites in a single plane may be launched together as a rideshare on a single launch vehicle and then distributed around an orbital plane using variable drag to control satellite spacing.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A satellite configured to simultaneously receive and transmit data in space, comprising:

a receiver configured to receive an incoming beam transmitted from a source along a receive vector between the source and the receiver;

an attitude-control system configured to rotate the satellite about an axis parallel to the receive vector;

a transmitter configured to generate a transmit beam along a transmit vector; and a gimbal having a single rotation axis, the single rotation axis of the gimbal is substantially perpendicular to the receive vector, wherein the gimbal is configured to rotate a transmit vector using a mirror attached to the gimbal about the single rotation axis that is substantially perpendicular to the receive vector, and the receiver comprises an optical receiver configured to receive the incoming beam, and optically amplify the incoming beam prior to converting the incoming beam to an electronic signal.

2. The satellite of claim 1, wherein the transmitter comprises an optical transmitter configured to transmit a laser beam.

3. The satellite of claim 1, wherein the optical receiver is further configured to directly connect to an optical amplifier and an optical transmitter without conversion to an electronic signal.

4. The satellite of claim 1, further comprising:
a receive beacon configured to transmit an optical beacon visible to the source, providing alignment information to the source.

5. The satellite of claim 1, further comprising:
a receive beacon camera configured to detect a signal from the source for use in aligning the incoming beam with the receiver.

6. The satellite of claim 1, further comprising:
a receive reflector configured to focus the incoming beam onto the receiver.

7. The satellite of claim 1, further comprising:
a transmit beacon configured to transmit a signal to a destination, assisting in aligning of the transmit beam with a receiver at the destination.

8. The satellite of claim 1, further comprising:
a transmit beacon camera configured to monitor an optical beacon sent by the destination to assist in alignment of the transmit beam with the destination.

9. A satellite configured to receive and transmit data in space, comprising:
a receiver configured to receive an incoming laser beam from a source;
an attitude control system configured to rotate the satellite about an axis parallel to the incoming laser beam; and
a gimbal having a single rotation axis configured to rotate a mirror about a single rotation axis to allow a transmitter to transmit the laser beam to a destination, wherein
the single rotation axis of the gimbal is substantially perpendicular to the incoming laser beam, and the receiver comprises an optical receiver configured to receive the incoming laser beam, and optically amplify the incoming laser beam prior to converting the incoming laser beam to an electronic signal.

10. The satellite of claim 9, wherein the source comprises a relay satellite or a ground station.

11. The satellite of claim 9, wherein the destination comprises a relay satellite or a ground station.

12. The satellite of claim 9, wherein the rotation of the satellite and the rotation of the mirror occur concurrently.

13. The satellite of claim 9, wherein the rotation of the satellite and the rotation of the mirror occur sequentially.

14. A satellite configured to simultaneously receive and transmit data in space, comprising:
a receiver configured to receive an incoming beam transmitted from a source along a receive vector between the source and the receiver;
an attitude-control system configured to rotate the satellite about an axis parallel to the receive vector;
a transmitter configured to generate a transmit beam along a transmit vector; and
a gimbal having a single rotation axis, the single rotation axis of the gimbal is substantially perpendicular to the receive vector, wherein
the gimbal is configured to rotate the transmitter attached to the gimbal about the single rotation axis, and
the receiver comprises an optical receiver configured to receive the incoming beam, and optically amplify the incoming beam prior to converting the incoming beam to an electronic signal.

15. The satellite of claim 14, wherein the optical receiver is further configured to directly connect to an optical amplifier and an optical transmitter without conversion to an electronic signal.

16. The satellite of claim 14, further comprising:
a receive beacon configured to transmit an optical beacon visible to the source, providing alignment information to the source.

17. The satellite of claim 14, further comprising:
a receive beacon camera configured to detect a signal from the source for use in aligning the incoming beam with the receiver.

18. The satellite of claim 14, further comprising:
a receive reflector configured to focus the incoming beam onto the receiver.

19. The satellite of claim 14, further comprising:
a transmit beacon configured to transmit a signal to a destination, assisting in aligning of the transmit beam with a receiver at the destination.

20. The satellite of claim 14, further comprising:
a transmit beacon camera configured to monitor an optical beacon sent by the destination to assist in alignment of the transmit beam with the destination.

* * * * *